ANGULAR-VELOCITY MODULATION TRANSMITTER

Filed March 27, 1958

INVENTOR.
KERNS H. POWERS
BY
[signature]
ATTORNEY

Sept. 11, 1962 K. H. POWERS 3,054,073

ANGULAR-VELOCITY MODULATION TRANSMITTER

Filed March 27, 1958 2 Sheets-Sheet 2

INVENTOR.
KERNS H. POWERS
BY D.A. Rechif
ATTORNEY

United States Patent Office 3,054,073

Patented Sept. 11, 1962

3,054,073

ANGULAR-VELOCITY MODULATION TRANSMITTER

Kerns H. Powers, Lawrence Township, Mercer County, N.J., assignor to Radio Corporation of America, a corporation of Delaware Filed Mar. 27, 1958, Ser. No. 724,453
14 Claims. (Cl. 332—17)

This invention relates to an improved transmitter for generating a signal the instantaneous phase or frequency of which varies with the intelligence desired to be conveyed.

Conventional phase modulation (PM) or frequency modulation (FM) transmitters have been termed angular-velocity modulation transmitters. That is, the generic term angular-velocity modulation transmitters includes both FM and PM transmitters, and the term angular-velocity modulation includes both FM and PM. The intelligence in such PM or FM transmitters is conveyed by variation of the instantaneous phase or frequency. The signal generated by such transmitters is fully compatible, that is, the same can be detected by conventional limiter-discriminator detection methods, as employed in ordinary PM or FM receivers. Thus, no special receivers are required to receive the signal generated by such transmitters, and if such generated signals are broadcast, they can be received on cheap home-type receivers of the PM or FM type.

In addition to the compatibility previously referred to, which is also possessed by the transmitter of this invention, the transmitter of the present invention has a very important advantage as compared to conventional angular-velocity modulation transmitters. The signal generated by the transmitter of this invention occupies approximately only half the spectrum space occupied by a conventional phase modulated or frequency modulated signal. In general, reduction of bandwidth is becoming increasingly important at the present time, in view of the crowded radio spectrum. In particular, the reduction of bandwidth is important in video tape recording as presently practiced. In such recording, PM and FM have the advantage of minimizing the effects of tape nonlinearities and inhomogeneities, whereas the limited frequency response of the recording heads dictates the maximum spectrum space available. It is desirable to provide a signal to these recording heads whose spectrum is rather closely related to the frequency response of the heads, so that minimum distortion will be introduced.

In order to conserve frequency spectrum, it has previously been proposed to utilize single sideband (SSB) transmission, the SSB signal being developed by any of several amplitude modulation (AM) techniques known in the art. However, the signals generated by SSB transmitters are not compatible in the sense previously discussed, since such signals must be detected by special, complicated, and expensive receivers employing synchronous detection or demodulation with a carrier generated locally in the receiver; the maintaining of the frequency of this locally-generated carrier with sufficient accuracy presents a problem in receiver design.

One of the main objects of this invention is to provide a novel transmission system wherein the signal generated is fully compatible and capable of detection by an ordinary, home-type receiver, yet occupies a greatly reduced spectrum space as compared to the signal generated in conventional transmitters.

Another object is to provide a novel angular-velocity modulation transmitter.

The objects of this invention are accomplished, briefly, in the following manner: An input signal representing the intelligence to be conveyed (e.g., video, voice, or other form of modulation) is applied to the input of a wide-band 90° phase-splitting network, or alternatively to a wide-band 90° phase shifter, thereby to develop two output waves which are both related to the input signal and are in phase quadrature with each other. The first of these two quadrature-related signals is applied as a modulating signal to an angular-velocity modulator (which may be a phase modulator in one embodiment of the invention), thereby to angular-velocity modulate a carrier wave. The second of the two aforementioned quadrature-related signals is passed through a nonlinear device having an exponential transfer characteristic, thereby to produce an output signal therefrom which is the exponential of the input signal applied thereto. This exponential output signal is applied as a modulating signal to an amplitude modulator, thereby to amplitude modulate the angular-velocity modulated wave output of the phase modulator, to produce a hybrid amplitude- and phase-modulated wave which possesses side frequencies lying on only one side of the nominal carrier frequency and which carries the intelligence in its instantaneous phase variations. In an alternative embodiment, a hybrid amplitude- and frequency-modulated wave of the same general type may be produced by applying the first of the two quadrature-related signals to a frequency modulator, to thereby frequency modulate an oscillator, and then to an amplitude modulator, and by feeding the second of the two quadrature-related signals to the same amplitude modulator through an integrating network and a nonlinear, exponential-transfer-characteristic device. To summarize, by utilizing techniques of simultaneous AM and PM, a modulated signal whose instantaneous phase or frequency varies with the desired intelligence, and having components on only one side of the carrier frequency, is generated. This generated signal is fully compatible, in the sense previously discussed.

It may be desirable to generate a modulated wave or signal whose instantaneous frequency varies with the desired intelligence, and having all of its side-frequency components on one side of a frequency slightly displaced from the carrier frequency, and wherein the side-frequency components extend on both sides of the carrier but to different degrees. In this case a modulated wave somewhat analogous to a vestigal AM sideband is produced. Alternatively, the side-frequency components may lie on only one side of the carrier frequency. Either of these results may be approximated according to this invention by utilizing the input intelligence to frequency modulate an oscillator, then passing the frequency modulated signal through a filter which eliminates either all or a portion only of one group of side-frequencies, detecting the envelope function appearing in the filter output, and utilizing this envelope function to amplitude modulate the frequency modulated output of the oscillator. In this way, there is produced a hybrid amplitude- and frequency-modulated wave which possesses side-frequencies lying (to a close approximation) on only one side of the carrier frequency or a frequency displaced from the carrier frequency, and which carries its intelligence in its instantaneous frequency variations. This produced wave is fully compatible, in the sense previously discussed.

A detailed description of the invention follows, taken in conjunction with the accompanying drawings, wherein:

FIG. 1 is a block diagram of a transmitter constructed in accordance with one embodiment of this invention;

FIG. 1*a* is a block diagram of a modified form of the invention shown in FIG. 1;

A hybrid amplitude- and phase-modulated wave may be expressed in the form: $\alpha(t)\cos[\omega_0 t+\phi(t)]$. This is equivalent to simultaneous AM by $\alpha(t)$ and PM of the carrier signal $\cos \omega_0 t$ by $\phi(t)$. If such a wave is properly generated and then transmitted, the intelligence can be conveyed either by the instantaneous phase $\phi(t)$ or by its derivative, the instantaneous frequency $\phi'(t)$, or by the envelope $\alpha(t)$. The intelligence can then be recovered at the receiver by limiter-discriminator techniques (as employed in conventional FM and PM receivers) in the case of the phase $\phi(t)$ and the frequency $\phi'(t)$, or by envelope detection of the amplitude $\alpha(t)$. The present invention relates to the first of these two concepts, that is, the conveying of the intelligence by the instantaneous phase $\phi(t)$ or its derivative, the instantaneous frequency.

Figures 1, 1A, 2:
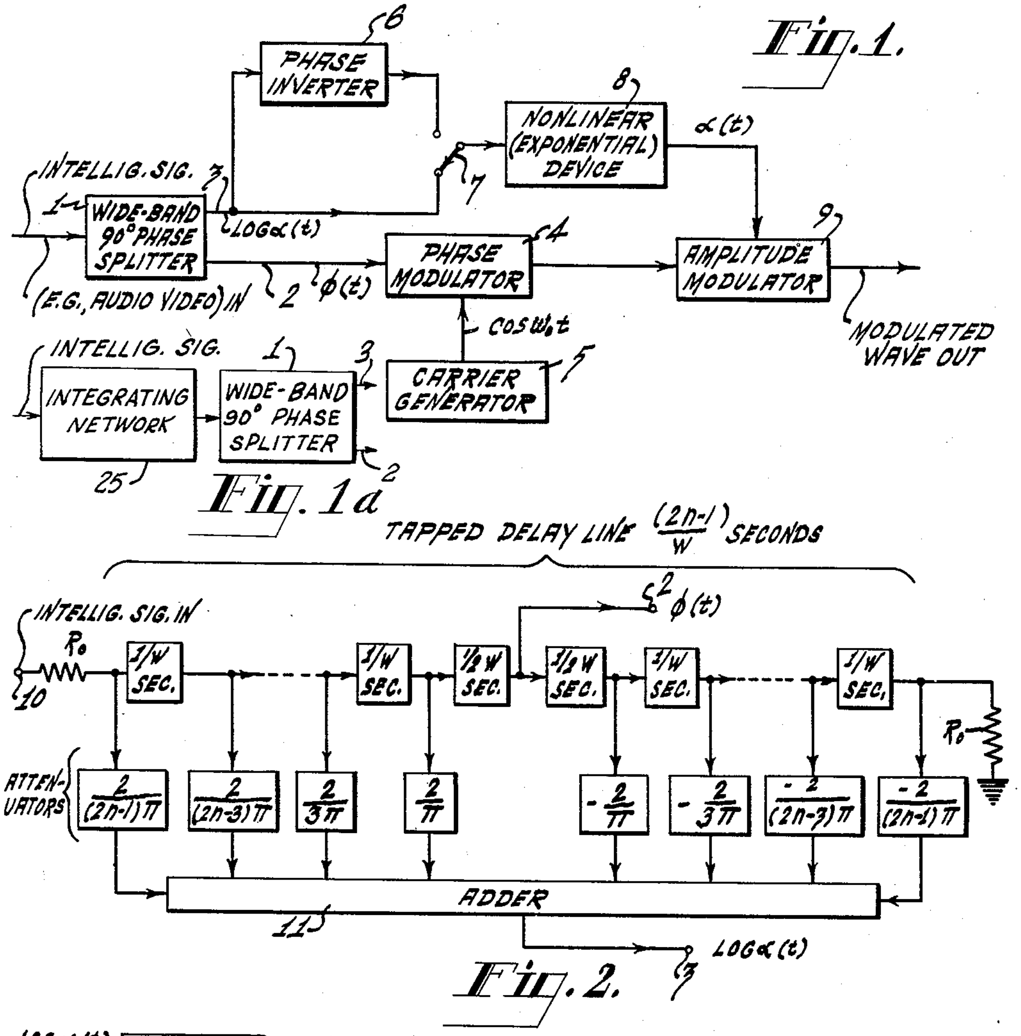
FIG. 2 is a detailed diagram of a wide-band 90° phase-splitting network.

FIGURE 1 is a block diagram of a system for generating a hybrid amplitude- and phase-modulated wave having components lying on only one side of the carrier, and whose instantaneous phase is $\phi(t)$. The input signal, the intelligence to be transmitted, is fed into a wide-band 90° phase-splitting network 1 whose two outputs (appearing respectively on output leads 2 and 3) are in phase quadrature. In systems wherein the intelligence signal is voice, phase distortion has little effect on intelligibility, so any reasonable wide-band phase shift network may be used at 1. For example, a network having any of the various configurations disclosed in "Wideband Phase Shift Networks" by R. B. Dome, Electronics, December 1946, pp. 112–115, can be used here. In systems wherein the intelligence signal is video, phase distortion cannot be tolerated; in this case, the output signal on lead 2 must be a delayed replica of the input signal to splitter 1, and the phase splitter can then be of the type to be described more fully hereinafter, in connection with FIG. 2.

In a hybrid amplitude and phase-modulated wave of the type discussed above, the envelope $\alpha(t)$ and the phase $\phi(t)$ may be related to each other, and this is particularly true if the hybrid wave is intended to have components lying on only one side of the carrier. By way of illustration, assume that the intelligence to be conveyed is in the form of a sinusoidal signal of angular frequency $\theta$, that is, of the form $\Delta \sin \theta t$, where $\Delta$ is an arbitrary constant. With reference to FIGURE 1, this intelligence signal is passed through the wideband 90° phase-splitter 1, to produce the signals 2 and 3, $$\phi(t)=\Delta \sin \theta t$$
$$\log \alpha(t)=\Delta \cos \theta t$$

that have identical amplitudes but differ in phase by 90°. The signal at the input to the nonlinear (exponential) device 8 has the form $\pm\Delta \cos \theta t$, where the minus sign applies to the case with switch 7 in the position for which the phase inverter 6 is in the circuit, whereas the positive sign applies to the switch position shown in the figure. The output of the exponential device accordingly becomes $$\alpha(t)=e^{\pm\Delta \cos \theta t}$$

The output of the phase modulator 4 is the phase modulated wave $$\cos[\omega_0 t+\Delta \sin \theta t]$$

and the output of the amplitude modulator 9 has the form $$e^{\pm\Delta \cos \theta t}\cos[\omega_0 t+\Delta \sin \theta t]$$

This expression may be expanded into the infinite trigonometric series $$\cos \omega_0 t+\Delta \cos(\omega_0 \pm \theta)t+\Delta^2 \cos(\omega_0 \pm 2\theta)t+ \ldots +\Delta^n \cos(\omega_0 \pm n\theta)t+ \ldots$$

as shown on pages 86 and 87 in a book by L. B. W. Jolley entitled "Summation of Series," published by Chapman and Hall, Ltd. London, 1925. This expansion expresses the hybrid amplitude and phase modulated wave in terms of its spectral components; the first term, $\cos \omega_0 t$, representing the carrier component and the term $\Delta^n \cos(\omega_0 t \pm n\theta)t$ representing the $n$th order sideband component, the plus sign corresponding to an upper sideband and a minus sign corresponding to a lower sideband. Either the upper or lower sideband can be selected by a proper choice of the position of switch 7.

As previously described, the function $\phi(t)$ is in phase quadrature with the logarithm of the envelope $\alpha(t)$. For all essential purposes, the output signal on lead 2 of network 1 may be considered the same as the input intelligence signal to network 1, and in fact, if the network of FIG. 2 is used at 1, the signal $\phi(t)$ on lead 2 is an exact but merely delayed replica of the input signal to network 1. The signal $\phi(t)$ on output lead 2 contains the intelligence corresponding to the instantaneous phase of the input intelligence signal, of whatever kind the latter may be.

The signal on output lead 3, being in phase quadrature with the signal $\phi(t)$ on lead 2, is the function denoted by $\log \alpha(t)$, the logarithm of the envelope. This signal $\log \alpha(t)$ is fed either directly or through a phase inverter 6 (as selected by a switch 7, which is illustrated in the "direct feed" position) to the input of a nonlinear device 8. Since the phase inverter 6 inverts the polarity of one output of the phase splitter 1 and since the two outputs thereof are in phase quadrature, in one position of switch 7 the $\log \alpha(t)$ signal fed to device 8 leads the $\phi(t)$ signal by 90°, while in the other switch position the $\log \alpha(t)$ signal fed to device 8 lags the $\phi(t)$ signal by 90°.

The nonlinear device 8 is a zero-memory nonlinear device having an exponential transfer characteristic of the form $y=\exp x$, where $y$ is the output voltage for an input voltage $x$. Alternatively, this characteristic may be expressed as $y=e^x$, where $x$ and $y$ have the same significance as before, and $e$ is the base of natural logarithms. The nonlinear device 8 may for example be of the type to be described more fully hereinafter, in connection with FIG. 3.

Since the output of device 8 is the function itself, that is, the desired envelope $\alpha(t)$, and since this device has an exponential transfer characteristic, the input to device 8 from splitter 1 is the logarithm of the function $\alpha(t)$. This output signal $\alpha(t)$ is guaranteed to be non-negative by the exponential transfer characteristic of device 8.

As a result of the action of the circuit components previously described, there have been produced the proper and necessary phase function $\phi(t)$ and envelope function $\alpha(t)$ for the simultaneous PM and AM of the carrier, to produce a cancellation action such that side-frequency components lie on only one side of the carrier. At the same time, the modulated wave produced partakes of the characteristics of an FM or PM wave, in that the intelligence is conveyed by the instantaneous phase or frequency variations of the wave.

The signal $\phi(t)$ on output lead 2 of network 1 is fed as the modulating signal to an angular-velocity modulator 4, which may be a phase modulator in FIG. 1. The phase modulator 4 may be of any suitable, conventional type. A carrier wave $\cos \omega_0 t$ is also fed to this same modulator, from a suitable carrier generator 5. In the modulator 4, the $\phi(t)$ signal phase modulates the carrier wave $\cos \omega_0 t$, to produce a phase modulated wave which may be expressed as $\cos [\omega_0 t+\phi(t)]$, where $$\phi(t)=\Delta \sin \theta t$$

The phase modulated wave output of phase modulator 4 is fed to an amplitude modulator 9, to comprise in effect the carrier wave supply for this modulator. The signal output of device 8 (which, as previously explained, is the envelope function $\alpha(t)$) is fed to modulator 9, to comprise the modulating signal supply for this modulator. In modulator 9, the signal $\alpha(t)$ modulates the signal which had been phase modulated (in phase modulator 4) by $\phi(t)$, producing the hybrid amplitude- and phase-modulated wave $$\alpha(t) \cos [\omega_0 t+\phi(t)]$$

Since the $\phi(t)$ and $\alpha(t)$ signals have been properly developed from quadrature-related signals, the output of modulator 9 is a modulated wave having spectral or side-frequency components lying on only one side of the carrier. The instantaneous phase of this wave is $\phi(t)$. In other words, a cancellation action in effect occurs in amplitude modulator 9, whereby one group of side-frequency components (i.e., the side-frequency components lying on one side of the carrier frequency) is effectively cancelled from the output of phase modulator 4.

It is desired to contrast the present invention with an arrangement wherein simply a filter is used to remove one group of side-frequency components from the output of phase modulator 4. The use of a filter will inherently produce distortion, and in particular distortion of the instantaneous phase, in the output. The present invention, on the other hand, which uses an AM technique for cancellation, changes the group of side-frequencies not cancelled out in such a way (amplitude-wise) as to prevent any distortion from arising. Thus, the present invention is a highly advantageous and effective arrangement for reducing the bandwidth necessary for the transmission of an angularly-modulated signal.

Either the upper or the lower group of side-frequencies may be selected by inverting the polarity of one output of the phase splitter 1 (as, for example, by the use of the phase inverter 6 in connection with switch 7). An upper group of side-frequencies (i.e., the side-frequencies above the carrier) is produced when $\log \alpha(t)$, as fed to nonlinear device 8, is made to lead $\phi(t)$ by 90°, while a lag of 90° produces a lower group of side-frequencies.

Although the envelope variation (in response to the envelope signal $\alpha(t)$) of an angularly-modulated signal is necessary for a spectrum having components on only one side of the carrier, this envelope variation (or AM) may be removed by limiters at the receiver, and detection can then proceed in the customary manner. That is, an ordinary PM or FM receiver (employing a conventional limiter-discriminator arrangement) can be used, so that the signal generated by the transmitter of this invention is fully compatible. The limiter in the receiver reinserts the undesired group of side-frequencies, but at that point, the reduced bandwidth is no longer of importance.

FIG. 2 discloses a wide-band 90° phase-splitter which may be used at 1 in FIG. 1. Referring to FIG. 2, for an $n$th order approximation, a delay with $(2n-1)$ taps is terminated at both ends in its characteristic impedance $R_0$. The taps are spaced at delays of 1/W seconds, where W is the upper limit, in c.p.s., of the input intelligence signal. There is an additional tap at the center of the line. The input intelligence signal is applied to the input terminal 10 of the line, and the delayed signal $\phi(t)$ is retrieved from the center tap 2. The signals at the taps ahead of the center (toward the input) represent the future samples of the signal $\phi(t)$, while those at taps between the center and the termination represent past samples. The signals at the future history taps are attenuated by factors $2/(2n-1)\pi$, where $n$ is an integer corresponding to the tap position away from the center. The signals at the past history taps are inverted and attenuated by the same factor. The attenuated signals are combined in an adder 11 (which effects a linear combination of the values at all taps) to produce the phase quadrature signal $\log \alpha(t)$ at the output terminal 3 of the adder.

For larger values of $n$, hence a longer delay line, the magnitude of the transfer function (from the signal at terminal 2 to that at terminal 3) converges to unity over the pass band. The phase shift is maintained at 90° throughout the pass band, for all orders of approximation. The signal $\phi(t)$ at terminal 2 is an exact delayed replica of the input of the line (at terminal 10), and suffers no phase distortion with a perfect delay line. The output signals of the network (at terminals 2 and 3 in FIG. 2, which correspond respectively to leads 2 and 3 in FIG. 1) may be utilized as disclosed in FIG. 1.

Figure 3:
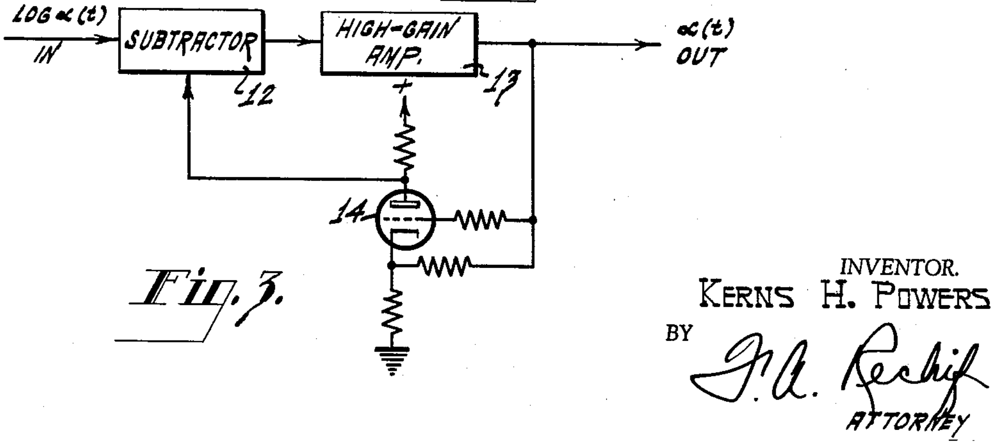
FIG. 3 is a somewhat detailed diagram of a nonlinear (specifically, exponential) device.

FIG. 3 discloses an arrangement which can be used for the nonlinear exponential device 8 of FIG. 1. In FIG. 3, the $\log \alpha(t)$ signal, coming via switch 7 of FIG. 1, is applied to one input of a combiner (specifically, a subtractor) network 12. The output of subtractor 12 is fed to the input of a high-gain amplifier 13 whose output in turn provides the envelope signal $\alpha(t)$ which is fed to amplitude modulator 9. In order to make the output of amplifier 13 equal to the exponential of the input signal fed to subtractor 12, a feedback circuit is provided from the output of amplifier 13 back to the other input of subtractor network 12. This feedback circuit includes a triode 14 connected to act as a logarithmic amplifier, in other words, a circuit that provides an output equal to the logarithm of the input. It can be shown that, with a logarithmic amplifier 14 in the feedback loop as illustrated, the output of amplifier 13 is a very close approximation to the exponential of the input to a subtractor 12, providing the gain of amplifier 13 is much greater than unity.

In order to produce a frequency modulated signal having side frequencies lying on only one side of the carrier frequency, only minor modifications of the FIG. 1 system need be made. Since the instantaneous frequency is proportional to the rate of change of the phase, the input intelligence may be pre-emphasized by an integrating network, to produce a phase variation for PM as before. In other words, the integration of the instantaneous frequency is carried out to derive the phase function, and the output of the integrating network 25 is fed to the input of network 1 in FIG. 1, as shown in FIG. 1*a*.

If we assume a sinusoidal frequency modulation of frequency $\theta$ and deviation $\Delta\theta$, the phase function becomes $\phi(t)=\Delta \sin \theta t$, and its quadrature is given by log $$\alpha(t)=\Delta \cos \theta t$$

After passing through the device 8, the envelope signal is $\alpha(t)=e^{\Delta \cos \theta t}$. Since the envelope assumes a peak value of exp Δ, it is clear that severe peaking occurs when the deviation is high or the modulating frequency is low. Thus, it is important that the modulating signal have a band pass not extending to zero. The peaking factor becomes excessive as the modulating signal bandwidth occupies too many decades. This is not an unreasonable result to expect from a requirement that no spectral energy exist on one side of the carrier, even though the instantaneous frequency spends half its time there.

Figure 4:
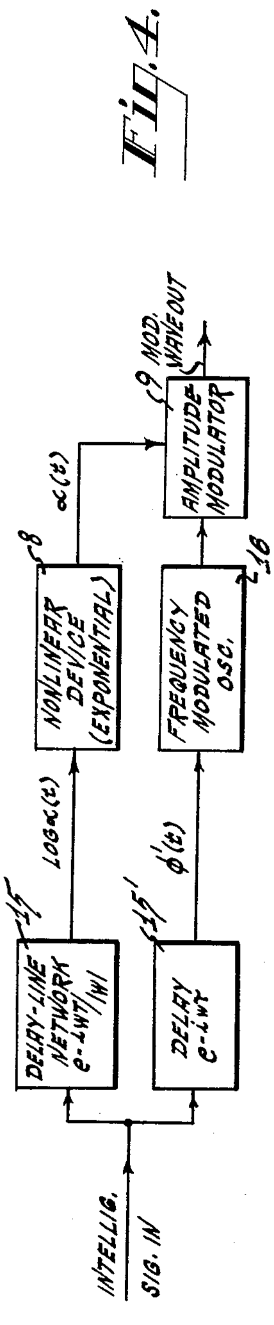
FIG. 4 is a block diagram of a transmitter constructed in accordance with another embodiment of the invention.

Alternatively, to produce an FM signal of reduced bandwidth, as desired, the action of the integrator and phase splitter can be combined, as in FIGURE 4. A network 15 having a transfer function as indicated in FIG. 4 can be synthesized by means of a tapped delay line similar to that in FIG. 2. The attenuators at each tap are chosen to be the Fourier coefficients of any curve that fits the function $1/\omega$ over the passband. In this way, integration of the input signal is effected, along with the 90° phase shift required to produce the log $\alpha(t)$ signal. The input signal is delayed by the same duration to develop the proper $\phi'(t)$ signal. This delay may be provided by a portion 15' of the tapped delay line 15, as in FIG. 2.

The signal $\phi(t)$ is used to frequency modulate an oscillator 16, this frequency modulated oscillator circuit being conventional. Since direct FM, rather than PM, is employed here, no integration is needed in the $\phi'(t)$ channel. The output of the delay line network 15 is passed through the exponential nonlinear device 8 to produce the envelope function $\alpha(t)$, which then amplitude modulates (in amplitude modulator 9) the frequency modulated signal output of the frequency modulated oscillator 16.

The action in FIG. 4 is quite similar to that in FIG. 1, except that in FIG. 4 a hybrid amplitude- and frequency-modulated signal is produced. This hybrid signal conveys intelligence by its instantaneous frequency variations, but has a greatly reduced bandwidth compared to an ordinary, conventional FM signal, since it has side frequencies lying on only one side of the carrier frequency.

As has previously been pointed out, severe peaking of the envelope occurs when the deviation is high or the modulating frequency is low. Thus, the invention has its main usefulness in the field of narrow-band or narrow-deviation FM communications. This peaking effect can be reduced, without limiting the pass band of the modulating signal, by causing the generated hybrid wave to have all of its energy on one side of any frequency displaced from the carrier, rather than on one side of the carrier frequency itself. This result might be thought of as somewhat equivalent to a vestigial sideband, and such a hybrid amplitude- and phase-modulated wave may be generated in FIG. 1 by adding a suitable direct current to the input intelligence signal. With a wave the instantaneous phase or frequency variations of which convey the intelligence, it may be a little difficult to add the proper direct current, in such a way that the hybrid wave has all of its side-frequency components on one side of a frequency displaced from the carrier.

Figure 5:
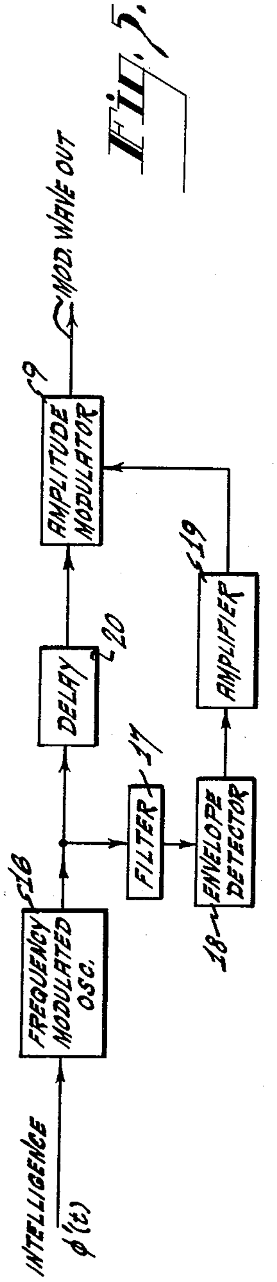
FIG. 5 is a block diagram of a modified form of the invention.

It has been previously pointed out herein that if a conventional PM or FM signal is also modulated in amplitude by an envelope satisfying a certain relation with the instantaneous phase, one group of side-frequency components (on one side of the carrier) is effectively cancelled. There has been disclosed means for obtaining accurately the required envelope, from the intelligence signal. FIG. 5 discloses an arrangement, simpler in certain respects than that of FIG. 1, for approximating the required envelope for both of the following types of hybrid wave: (1) a wave having all of its side-frequency components on one side of the carrier frequency; and (2) a wave having all of its side-frequency components on one side of a frequency displaced from the carrier frequency.

It has been determined that, for a prescribed phase function $\phi(t)$, there exists an envelope function $\alpha(t)$ for which the hybrid wave $\alpha(t)\cos[\omega_0 t+\phi(t)]$ contains all of its energy on one side of any frequency displaced from the carrier. For example, if the frequency deviation is limited to $\pm\Delta$, the hybrid wave can be made to have no energy either above $(\omega_0+\Delta)$, or below $(\omega_0-\Delta)$, with the proper choice of envelope. Let us assume the former case, and call $\alpha(t)$ the envelope which limits the spectral distribution of the hybrid wave to frequencies below $(\omega_0+\Delta)$ for a sufficiently high carrier frequency $\omega_0$. FIG. 5 discloses means for approximating the envelope $\alpha(t)$ for a given phase signal $\phi(t)$.

Referring now to FIG. 5, an intelligence signal $\phi'(t)$ is applied as the modulating signal to a frequency modulated oscillator 16. This input intelligence signal may be denoted by $\phi'(t)$ since FM of the oscillator is being performed, in which process integration in effect occurs to produce a frequency modulated signal having a phase function $\phi(t)$. In other words, the input intelligence signal may be considered as the derivative of the phase function $\phi(t)$.

The frequency modulated output of oscillator 16 may be represented by $\cos[\omega_0 t+\phi(t)]$, which is a pure FM or PM wave. A portion of this wave is passed through a filter 17 that removes either part or all of one group of side-frequency components, say that portion above $(\omega_0+\Delta)$, where $\omega_0$ is the rest or center frequency of oscillator 16 and $\Delta$ is the maximum frequency deviation of this oscillator. The output of filter 17 varies in both envelope and phase, a result inherent in the very act of filtering out some of the side-frequency components from a modulated wave. Thus, an envelope function is in effect inserted into the frequency modulated output of unit 16. The signal output of filter 17 may be written as $$\alpha_1(t)\cos[\omega_0 t+\phi_1(t)]$$

Although the phase function $\phi_1(t)$ represents a distortion of the phase function $\phi(t)$ in the output of unit 16, that distortion is only on the order of a few percent. Clearly, $\alpha_1(t)$ is an approximation to the exact envelope function $\alpha(t)$ needed for limitation of the spectral distribution of the final, hybrid wave to frequencies below $(\omega_0+\Delta)$. The less the phase distortion occurring in filter 17, the nearer will $\alpha_1(t)$ be to the exact envelope function $\alpha(t)$.

By means of an envelope detector 18, which may for example be a simple diode detector, the envelope function $\alpha_1(t)$ is extracted from the hybrid amplitude-modulated and frequency modulated output of filter 17. This signal $\alpha_1(t)$ is amplified in a suitable amplifier 19.

The remaining portion of the frequency modulated output of oscillator 16 is passed through a delay network 20 which provides a delay sufficient to compensate for the delay inherent in filter 17, and the delayed signal $\cos[\omega_0 t+\phi(t)]$ is passed on to the amplitude modulator 9, there to be modulated in amplitude by the detected and amplified envelope $\alpha_1(t)$, which latter signal is fed from the output of amplifier 19 to modulator 9. The resulting signal (the output of amplitude modulator 9) is a hybrid amplitude- and frequency-modulated wave. This latter modulated wave contains some energy outside the filtered group of side-frequencies, due to the non-identity of $\alpha_1(t)$ with the exact envelope function $\alpha(t)$ needed to entirely eliminate such outside energy. However, this modulated wave output of amplitude modulator 9 contains substantially less energy outside the filtered group of side-frequencies than the pure FM signal output of oscillator 16. Consequently, if this hybrid wave (output of amplitude modulator 9) is transmitted through a channel whose upper frequency limit is $(\omega_0+\Delta)$, much less distortion of the phase will result than would have resulted without the envelope variation produced in amplitude modulator 9.

FIG. 5, as previously described, discloses an arrangement for generating a reduced-bandwidth FM signal, in which the exact envelope function $\alpha(t)$ needed is approximated for a given phase function $\phi(t)$. The signal generated may be thought of as somewhat like a vestigial sideband AM signal, but of course in the present invention the intelligence is conveyed by means of FM. The arrangement in FIG. 5, though it only approximates the exact bandwidth reduction provided by the FIG. 1 arrangement, is simpler in certain respects than the FIG. 1 arrangement. Thus, in FIG. 5 no wideband 90° phase-splitter is required, nor is any exponential device required; both of these networks might possibly be a little difficult to maintain in adjustment.

Figure 6:
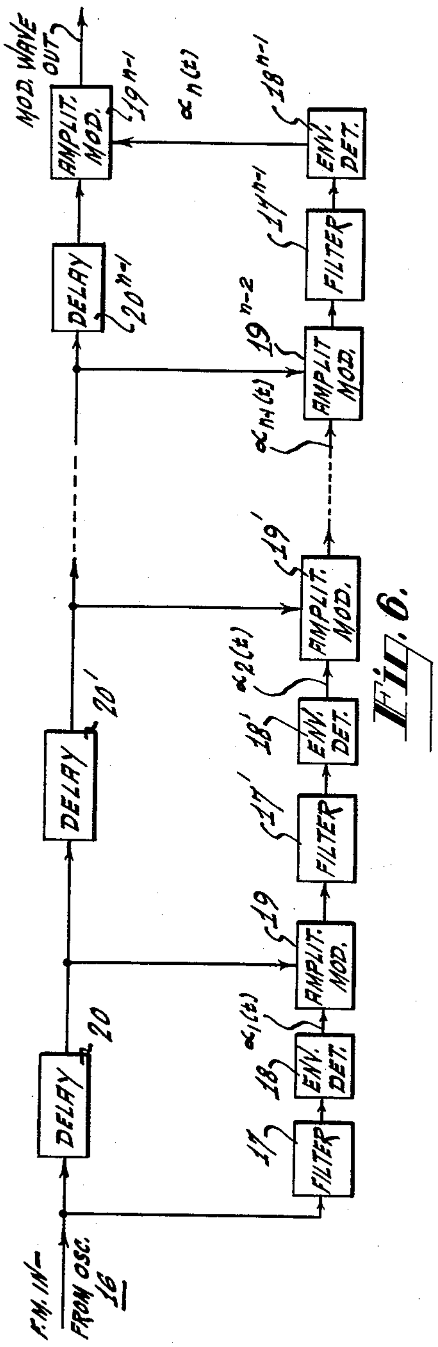
FIG. 6 is a block diagram of a modification of FIG. 5.

FIG. 6 discloses an arrangement which provides a second- or higher-order approximation, using the basic principles of FIG. 5. If the process disclosed in FIG. 5 is continued or repeated, as illustrated in FIG. 6, each stage gives an envelope function $\alpha_1(t)$, $\alpha_2(t)$, etc., which is a better approximation to the desired, exact envelope. The FIG. 6 arrangement may be thought of as an iterated, reduced-bandwidth FM generator. The iterative process illustrated in FIG. 6 is a very rapidly convergent one, and for most purposes a first- or second-order approximation is sufficient to reduce the unwanted side-frequency components to below an acceptable level.

What is claimed is:

1. In a transmitter, means for developing from a signal representing intelligence to be conveyed two waves in phase quadrature, means for angular-velocity modulating a carrier wave by one of said two waves, means for passing the other of said two waves through a nonlinear device having an exponential transfer characteristic, and means for amplitude modulating the angular-velocity modulated wave by the output of said nonlinear device.

2. In a transmitter, means including a wideband 90° phase splitter in the form of a tapped delay line for developing from a signal representing intelligence to be conveyed two waves in phase quadrature, means for phase modulating a carrier wave by one of said two waves, means for passing the other of said two waves through a nonlinear device having an exponential transfer characteristic, and means for amplitude modulating the phase modulated wave by the output of said nonlinear device.

3. In a transmitter, means for passing a signal representing intelligence to be conveyed through an integrating network, means receptive of the output of said network for developing therefrom two waves in phase quadrature, means for phase modulating a carrier wave by one of said two waves, means for passing the other of said two waves through a nonlinear device having an exponential transfer characteristic, and means for amplitude modulating the phase modulated wave by the output of said nonlinear device.

4. In a transmitter, means for applying a signal representing intelligence to be conveyed to two separate branches, means in the first branch for integrating said signal and shifting the phase thereof 90° relative to the signal in the second branch, thereby to develop waves in the respective branches which are in phase quadrature, means for angular-velocity modulating a carrier wave by the wave developed in the second branch, means for passing the wave developed in the first branch through a nonlinear device having an exponential transfer characteristic so as to produce in the output thereof an envelope function wave which is always of one polarity, and means for modulating the angular-velocity modulated wave by said envelope function wave.

5. In a transmitter, means for applying a signal representing intelligence to be conveyed to two separate branches, means in the first branch for integrating said signal and shifting the phase thereof 90° relative to the signal in the second branch, thereby to develop waves in the respective branches which are in phase quadrature, means for frequency modulating a carrier wave by the wave developed in the second branch, means for passing the wave developed in the first branch through a nonlinear device having an exponential transfer characteristic, and means for amplitude modulating the frequency modulated wave by the output of said nonlinear device.

6. In a transmitter, a source of a frequency modulated wave representing intelligence to be conveyed, a filter receptive of said wave for attenuating at least a portion, frequency-wise, of one of the two groups of side-frequency components constituting said wave, an envelope detector coupled to the output of said filter for developing from such output an envelope function wave, and means for modulating said frequency modulated wave by said envelope function wave.

7. In a transmitter, a source of a frequency modulated wave representing intelligence to be conveyed, a filter receptive of said wave for attenuating at least a portion, frequency-wise, of one of the two groups of side-frequency components constituting said wave, said filter having a time delay inherent therein, an envelope detector coupled to the output of said filter for developing from such output an envelope function wave, means receptive of said frequency modulated wave for delaying the same by an amount equal to said inherent time delay, and means for amplitude modulating said delayed frequency modulated wave by said envelope function wave.

8. In a transmitter, a source of a frequency modulated wave representing intelligence to be conveyed, a first filter receptive of said wave for attenuating at least a portion, frequency-wise, of one of the two groups of side-frequency components constituting said wave, a first envelope detector coupled to the output of said filter for developing from such output a first envelope function wave, first means for modulating said frequency modulated wave by said envelope function wave, a second filter receptive of the output of said modulating means for attenuating at least a portion, frequency-wise, of one of the two groups of side-frequency components which may be present in the output of said modulating means, a second envelope detector coupled to the output of said second filter for developing from such output a second envelope function wave, and second means for modulating said frequency modulated wave by said second envelope function wave.

9. A transmitter in accordance with claim 8, wherein the first and second modulating means are amplitude modulators.

10. In a transmitter, a source of a frequency modulated wave representing intelligence to be conveyed, a first filter receptive of said wave for attenuating at least a portion, frequency-wise, of one of the two groups of side-frequency components constituting said wave, said filter having a time delay inherent therein, a first envelope detector coupled to the output of said filter for developing from such output a first envelope function wave, first means receptive of said frequency modulated wave for delaying the same by an amount equal to said inherent time delay, first means for modulating said delayed frequency modulated wave by said envelope function wave, a second filter receptive of the output of said modulating means for attenuating at least a portion, frequency-wise, of one of the two groups of side-frequency components which may be present in the output of said modulating means, said second filter having a time delay inherent therein, a second envelope detector coupled to the output of said second filter for developing from such output a second envelope function wave, second means receptive of said delayed frequency modulated wave for further delaying the same by an amount equal to said last-mentioned inherent time delay, and second means for modulating said further delayed frequency modulated wave by said second envelope function wave.

11. In a transmitter, means to produce from a signal representing intelligence to be conveyed an angular-velocity modulated signal and a second signal having a logarithm which is in phase quadrature with the instantaneous phase of said modulated signal, a modulator separate from said means connected to the outputs of said means and arranged to amplitude modulate said modulated signal with said second signal, whereby there occurs in the output signal of said modulator a cancellation of frequency components lying on one side of the carrier frequency.

12. A transmitter as claimed in claim 11 and wherein said means is arranged to produce said angular-velocity modulated signal as a frequency modulated signal.

13. In a transmitter for conveying intelligence solely in the phase variations of a signal, means to produce from a signal representing intelligence to be conveyed a phase modulated signal and a second signal having a logarithm which is in phase quadrature with the instantaneous phase of said modulated signal, and a modulator separate from said means and coupled to the outputs of said means for amplitude modulating said modulated signal with said second signal.

14. In a transmitter, means for developing from a signal representing intelligence to be conveyed a first wave which is a delayed replica of said signal and a second wave in phase quadrature with said first wave, means for angular-velocity modulating a carrier wave by said first wave, means for passing said second wave through a nonlinear device having an exponential transfer characteristic, and means for amplitude modulating said angular-velocity modulated wave by the output of said nonlinear device.

References Cited in the file of this patent

UNITED STATES PATENTS

| | | |
|---|---|---|
| 2,202,327 | Purington | Nov. 12, 1935 |
| 2,358,152 | Earp | Sept. 12, 1944 |
| 2,500,945 | Hansen | Mar. 21, 1950 |
| 2,525,475 | Boykin et al. | Oct. 10, 1950 |
| 2,923,887 | Aiken | Feb. 2, 1960 |